United States Patent [19]

Aydin et al.

[11] 4,244,987

[45] Jan. 13, 1981

[54] MAGNETIC STORAGE MEDIUM

[75] Inventors: Ingrid Aydin, Neuried; Karlchristian Schillfarth, Planegg; Bernard Seidel, Gruenwald, all of Fed. Rep. of Germany

[73] Assignee: AGFA-Gevaert, A.G., Leverkusen, Fed. Rep. of Germany

[21] Appl. No.: 37,137

[22] Filed: May 8, 1979

Related U.S. Application Data

[63] Continuation of Ser. No. 851,402, Nov. 14, 1977, abandoned, and a continuation-in-part of Ser. No. 451,912, Mar. 18, 1974, abandoned.

[30] Foreign Application Priority Data

Mar. 24, 1973 [DE] Fed. Rep. of Germany ....... 2314757

[51] Int. Cl.$^3$ .............................................. H01F 10/02
[52] U.S. Cl. ...................................... 427/130; 427/128
[58] Field of Search ................................. 427/127–132, 427/48; 428/900; 252/62.54

[56] References Cited

U.S. PATENT DOCUMENTS

| | | | |
|---|---|---|---|
| 3,536,779 | 10/1970 | Bedikian | 260/827 |
| 3,729,438 | 4/1973 | Plesich | 260/29.6 R |
| 3,821,025 | 6/1974 | Akashi et al. | 252/62.54 |

*Primary Examiner*—Bernard D. Pianalto
*Attorney, Agent, or Firm*—Connolly & Hutz

[57] ABSTRACT

In a magnetic storage medium the ferromagnetic pigment is dispersed in a polymeric binder in an organic solvent and the binder comprises at least 50% by weight of a copolymer having alkoxysilane groups attached to the polymeric backbone. The hardening is brought about by acid- or base-catalyzed crosslinking of the alkoxysilane groups after the binder containing the alkoxysilane groups and the magnetic particles in the organic solvent solution is coated on a support.

1 Claim, No Drawings

MAGNETIC STORAGE MEDIUM

CROSS-REFERENCE

This application is a continuation of Ser. No. 851,402, Nov. 14, 1977 and a continuation-in-part of U.S. application Ser. No. 451,912, filed Mar. 18, 1974 by Ingrid Aydin et al for Magnetic Storage Medium both now abandoned.

This invention relates to a magnetic storage medium comprising a magnetisable layer which consists of a ferromagnetic pigment dispersed in a novel binder and formed into a novel layer after casting in a solution.

BACKGROUND OF THE INVENTION

In order that the potentialities of magnetic layers as storage media may be fully realised, the layers must satisfy stringent requirements not only in their technical properties when stored but above all in their mechanical properties. High-density signals cannot be stored on a magnetic layer which is covered with foreign particles even if its magnetic particles are otherwise suitable. This dust which interferes with storage is caused among other things by severe mechanical wear of the layer. The magnetic layer is frequently applied to a flexible support in the form of a tape which is guided inside the cassette or in the tape recorder, for example, by mechanical traversing stops and guide elements such as guiding and deflecting pins. The tape normally runs with the magnetic layer over these guide elements and is subjected to severe shearing stresses, especially at the edges. If abrasion which would thus interfere with the function of the magnetic layer is to be prevented, the highly pigmented layer must adhere firmly to the flexible support. This is because if any parts of the layer become detached from the support by the powerful local shearing stresses produced by the guide elements, these detached particles are liable to contaminate the surface of the magnetic layer and cause severe amplitude losses during the scanning process so that the stored information such as visual or acoustic signals are imperfectly reproduced.

The magnetic layer usually consists of the ferromagnetic pigment which is finely divided in the polymer matrix, the so-called binder. Adherence of this magnetic layer to a flexible layer support is mainly due to the action of side valencies of groups which are usually polar such as $NH_2-$, $-OH$ or $-COOH$. These groups, however, are frequently used up in chemical reactions with a hardener which is added to increase the abrasion resistance of the magnetic layer. The adherence of the layer to its support is thereby in most cases reduced so that the risk of abrasion along the edges is increased, especially sine cross-linking of the magnetic layer is accompanied by a certain increase in brittleness.

Various methods are known for increasing the adherence of the layer to the flexible support, for example the support may be covered with an adhesive layer before the magnetic layer is cast on it.

Another method consists of using support materials whose surface has been modified by chemical and physical treatment. The addition of certain surface-active substances to the magnetic layer has also been proposed. All these methods require an additional process step in the manufacture of the tapes, which may cause errors and the process also becomes less economic.

The magnetic layers must also avoid a physical roughness which will interfere with electroacoustic properties.

It was therefore an object of this invention to find binders for magnetic layers which in spite of being hardened would adhere so firmly to the flexible plastics support that the need for the use of adhesive layers or special additives would be avoided. At the same time the magnetic layer produced by the use of the binder must have a constitution which does not interfere with the electroacoustic properties while achieving an adequately uniform distribution of the magnetic pigment in the binder layer.

It has now been found that adherence of the magnetic layer to a flexible layer support and in particular to polyester supports could be considerably improved in spite of cross-linking of the layer, if the binder for the ferromagnetic pigment consists to an extent of at least 50% by weight of a copolymer which contains side chain alkoxysilane groups and if the binder is hardened after deposition on the flexible support and after uniform distribution of the magnetic particles in the binder, by an acid catalysed or alkaline catalysed cross-linking reaction.

The invention involves a dispersion of the ferromagnetic particles in the binder which is in solution in an organic solvent and which contains at least 50% by weight of the copolymer containing the side chain alkoxysilane groups. Vinyl-active trialkoxysilane groups are present in the range of 3 to 10% of the monomer units of the copolymer. The binder solution is first cast and then hardened by the cross-linking with the catalyst defined below. The hardening is by the crosslinking reaction of the alkoxysilane groups of the copolymer.

The copolymer containing side chain alkoxysilane groups is obtained by copolymerizing alkoxysilane compounds which contain copolymerizable carbon-carbon double bonds, especially vinyl groups with other comonomers which are free from alkoxysilane groups, such as vinyl chloride, vinylidene chloride, vinyl acetate, vinyl ethers, acrylic acid esters, methacrylic acid esters, acrylonitrile and styrene.

The alkoxysilane compounds which contain copolymerisable carbon-carbon double bonds preferably contain three alkoxy groups attached to the silicon atom and each of these alkoxy groups preferably contains 1 to 9 carbon atoms. These polymerisable alkoxysilane compounds may, for example, having the following formula

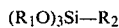

$$(R_1O)_3Si-R_2$$

in which $R_1$ represents an alkyl group containing 1 to 9 carbon atoms and $R_2$ represents a vinyl group or a group which contains a copolymerisable carbon-carbon double bond, for example a $\gamma$-methacryloxy-propyl group.

It is found to be a particular advantage of the alkoxysilanes used according to the invention that hydrolysis of the hydrolysable groups (alkoxy groups) does not liberate any substance harmful to the use properties of the magnetic layer.

Vinyl trimethoxysilane, vinyl triethoxysilane and vinyl tributoxysilane are examples of alkoxysilane monomers according to the invention but the alkoxysilanes may also contain nonyloxy groups instead of the lower alkoxy groups. The carbon chain in the alkoxy group may be linear or branched, for example vinyl tri-tert. butoxy-silane is particularly interesting because copolymers which contain tri-tert. butoxysilane groups are very insensitive to water.

Copolymerisation of the alkoxysilane compounds which contain copolymerisable carbon-carbon double bonds, especially vinyl groups, with other comonomers which also contain such copolymerisable groups may be carried out by the usual methods of the art provided any differences between the polymerisation parameters of the various components can be compensated by suitable control of the reaction conditions and the sensitivity of most silane compounds to hydrolysis is taken into account. Polymerisation is effected by a process of radical polymerisation in organic solvents.

Copolymers with side chain alkoxysilane groups are obtained under suitable reaction conditions. These polymers undergo cross-linking in the presence of water and acid or basic catalysts to form insoluble products. Suitable acid catalysts are, among others, alkyl benzene sulphonic acids such as p-toluene sulphonic acid, phosphoric acid and its acid esters such as dibutyl phosphate and phosphorous acids. Morpholine or diazabicyclooctane, for example, may be used as basic catalysts. The proportion of catalyst required is 0.1 to 1% by weight, based on the copolymer. The amount of water required depends on the trialkoxysilane content of the copolymer but for the purposes or the invention the moisture from the atmosphere and the quantity of water which is soluble in polar organic solvents and is usually in any case already present in commercial qualities of these solvents are generally sufficient.

The proportion of trialkoxysilane groups in the copolymer is determined by the number of cross-linking points which must be present in the binder system in order to obtain the desired mechanical properties of the magnetic layer, in particular its hardness. The concentration of trialkoxysilane groups is preferably within the range of 3 to 10% by weight of vinyl-active trialkoxysilane compound, based on the copolymer.

Cross-linking is carried out only when the dispersion has already been coated on the layer support. For this purpose, the dried magnetic layer is subjected to a brief heat treatment, for example by heating it to 100° C. to 130° C. for 3 to 10 minutes.

The improvement in the adherence between magnetic layer and support which is obtained when polymers containing trialkoxysilane groups are used as binders for magnetic layers can be seen most clearly if one compares the adherence of such a magnetic layer with that of one which has been prepared from an analogous polymer which is free from silane groups. To demonstrate the deleterious effect which cross-linking of the layer in most cases has on the adherence of the layer to its support, cross-linking of the analogous binder which was free from alkoxysilane groups was carried out with a melamine compound because in that case the alkoxy groups act as reactive centres in the same way as in the case of cross-linking with alkoxysilane polymers.

Polyvinyl chloride and its copolymers were used for this comparison. The results are shown in the table (Examples I and II).

In addition to containing the ferromagnetic pigment, for example a pigment based on iron oxide or chromium dioxide, the magnetic layer normally contains additives such as dispersing agents, lubricants and plasticizers. If desired, other binders, e.g. polyurethanes, may be used in addition to the trialkoxysilane polymer. It has been found that the binder according to the invention may contain up to 50% by weight, based on the total quantity of binder of the layer, of other polymers which are free from trialkoxysilane groups without the improvement in adherence being noticeably impaired. In all cases in which the binder system according to the invention is used, the magnetic layers obtained adhere very firmly to the flexible layer support in spite of the chemical cross-linking reaction.

The supports for the magnetic layer are in most cases polyester foils such as foils of polyethylene glycol terephthalate or polycarbonate or acetylated cellulose and polyvinyl chloride foils. The adherence of the magnetic layer is tested by the adhesive tape test in which commercial adhesive tapes are pressed on the layer and then quickly pulled off. The layer adhering to the adhesive tape is assessed qualitatively. Positive (firm adherence of the magnetic layer to the layer support) means: few or no particles of layer on the adhesive tape. Negative (poor adherence) means: considerable quantities of layer on the adhesive tape which has been stripped off.

The invention will now be described in more detail with the aid of examples illustrating the preparation of the binder and magnetic layer support.

1. Preparation of a copolymer (1) of vinyl chloride and vinyl triethoxysilane.

240 g of vinyl chloride and 10 g of vinyl triethoxysilane together with 1.75 g of dilauryl peroxide are introduced into a 1-liter glass autoclave. The autoclave is equipped with a stirrer which is moved at the rate of 250 revs. per min. The copolymer is obtained in the form of a pourable powder.

1a. Preparation of a copolymer (1a) of vinyl chloride and vinyl triethoxysilane.

The same method as described under 1. is employed but 225 g of vinyl chloride and 25 g of vinyl triethoxysilane are put into the reaction.

2. Preparation of a copolymer (2) of vinyl chloride and vinyl tri-tert. butoxysilane in aqueous suspension.

420 ml of distilled water, 19 ml of a 30% methyl cellulose solution, 1.43 g of dilauryl peroxide, 200 g of vinyl chloride and 20 g of vinyl tri-tert. butoxysilane are reacted together in an oxygen-free 1-liter glass autoclave. The polymerisation temperature is 55° C. The polymer is obtained as a fine granular suspension.

3. Preparation of a copolymer (3) of ethyl acrylate and vinyl triethoxysilane in solution.

A 2-liter three-necked flask equipped with stirrer, reflux condenser and thermometer is filled with nitrogen and charged with a mixture of 601 g of purified ethyl acrylate, 66.2 g of vinyl triethoxysilane, 0.62 of benzoyl peroxide and 453 g of anhydrous benzene. The solution is stirred at 102° C. 0.25 g of benzoyl peroxide in 61 g of benzene is slowly added dropwise after 2 hours. The reaction is carried out for a total of 6½ hours. The product can be purified by precipitation from petroleum ether.

4. Preparation of a copolymer (4) from ethyl acrylate and γ-methacryloxy-propyl trimethoxysilane in solution.

200 ml of a solution of the following components are introduced into an oxygen-free 3-liter three-necked flask equipped with stirrer, reflux condenser and dropping funnel:
540 g of ethyl acrylate,
60 g of γ-methacryloxy-propyl trimethoxysilane,
150 g of n-butanol,
450 g of toluene and
4.5 g of tert. butyl peracetate.

The solution is kept at 100° C. and the remaining monomer mixture is added in the course of 1 hour. The reaction mixture is then kept at 98° to 100° C. for a further 4 hours. The reaction product can be purified by reprecipitation.

5. Preparation of a copolymer (5) of styrene, acrylonitrile and γ-methacryloxy-propyl trimethoxysilane.

A solution of the following components is introduced into an oxygen-free 3-liter three-necked flask equipped with stirrer, reflux condenser and thermometer:
283.5 g of styrene,
121.5 g of acrylonitrile,
45 g of γ-methacryloxy-propyl trimethoxysilane and
5.0 g of azodiisobutyric acid nitrile.
The mixture is first kept at 60° C. for 4½ hours and then at 65° C. for 16 hours to complete the reaction. The reaction product is purified in the usual manner.

6. Preparation of a copolymer (6) of vinyl acetate and vinyl triethoxysilane in solution.

A solution of the following components is introduced into a 1-liter three-necked flask equipped with stirrer, reflux condenser and thermometer:
225 g of vinyl acetate
25 g of vinyl triethoxysilane,
172 g of acetone and
1.25 g of benzoyl peroxide.
The mixture is boiled under reflux for 19 hours. 0.5 g of benzoyl peroxide in 30 g of acetone is then added and boiling is continued for a further 7½ hours. The product can be purified by reprecipitation from solution.

based on fatty acid esters. The mixture is dispersed in a 1-liter sand mill with the aid of 500 g of glass beads measuring 1 mm, 2 mm and 3 mm in diameter. 0.3 g of p-toluene sulphonic acid is then added to the mixture and the resulting dispersion is filtered and then applied to the layer support of polyethylene glycol terephthalate in the usual manner and exposed to an orientating magnetic field shortly before drying. After drying, the layer is heated to 100° C. for a maximum of 5 minutes. Thereafter, it is no longer soluble in tetrahydrofuran.

The formulations for the magnetic layers according to the invention are shown in the table, in which examples III to XII refer to the systems according to the invention and examples I and II are shown for comparison.

Key to the Table

1. Carbon black, ®Corax L, manufacturers Degussa, Germany,
2. Dispersing agent, a mixture of primary and secondary phosphoric acid esters
3. ®Vinylite VAGH, copolymer of 91% by weight of vinyl chloride, 3% by weight of vinyl acetate and 5.9% by weight of vinyl alcohol, manufacturers Union Carbide, USA.
4. Polyurethane, polyester urethane based on butanediol, adipic acid and diphenylmethane diisocyanate
5. Melamine hardener, hexakis-methoxymethyl melamine, manufacturers American Cyanamid & Co., USA.

| Example | I | II | III | IV | V | VI | VII | VIII | IX | X | XI | XII |
|---|---|---|---|---|---|---|---|---|---|---|---|---|
| $\gamma\text{-Fe}_2\text{O}_3$ (g) | 150.0 | 150.0 | 150.0 | 150.0 | 220.0 $\text{CrO}_2$ | 128.0 | 150.0 | 150.0 | 150.0 | 150.0 | 150.0 | 150.0 |
| Carbon black (g) | 2.5 | 2.5 | 2.5 | 2.5 | 11.0 | 8.6 | 2.5 | 2.5 | 2.5 | 2.5 | 2.5 | 2.5 |
| Dispersing agent (g) | 6.0 | 6.0 | 6.0 | 6.0 | 3.0 | 3.2 | 4.0 | 4.0 | 4.0 | 4 | 5.0 soya lecithin | 6.0 |
| Copolymer | vinylite VAGH | vinylite VAGH | (1) | (2) | (1) | (1) | (3) | (4) | (5) | (6) | (1) | (1a) |
| Quantity of copolymer (g) | 38.0 | 36.0 | 38.0 | 38.0 | 40.0 | 17.5 | 31.0 | 38.0 | 38.0 | 20.0 | 38.0 | 38.0 |
| Alkoxysilane group | — | — | triethoxysilane | tritert.butoxysilane | triethoxysilane | triethoxysilane | triethoxysilane | trimethoxysilane | trimethoxysilane | triethoxysilane | triethoxysilane | triethoxysilane |
| Quantity of polyurethane (g) | — | — | — | — | — | 17.5 | 7.2 | — | — | copolys. (1) 18.0g | — | — |
| Quantity of lubricant (g) | 11.0 | 11.0 | 11.0 | 11.0 | 8.0 | 12.5 | 9.0 | 9.8 | 9.8 | 8.0 | 11.0 | 11.0 |
| Tetrahydrofuran (g) | 400 | 400 | 400 | 400 | 350 | 400 | 380 | 380 | 380 | 380 | 400 | 400 |
| Melamine hardener (g) | — | 2.0 | — | — | — | — | — | — | — | — | — | — |
| p-toluene sulphonic acid (g) | — | 0.3 | 0.3 | 0.5 | 0.3 | 0.9 | 0.9 | 0.9 | 0.9 | 0.6 | 0.5 morpholine | 0.8 |
| Adherence to adhesive tape | negative | negative | positive | pos. | pos. | pos. | pos. | pos. | pos. | pos. | pos. | pos. |

EXAMPLE OF THE PREPARATION OF A MAGNETIC LAYER 150 g of needle-shaped $\gamma\text{-Fe}_2\text{O}_3$ having a coercive force of 325 Oe and 2.5 g of carbon black marketed by Degussa under the trade designation ®Corax L are mixed with a solution of the following ingredients in 400 g of tetrahydrofuran:

6.0 g of an acid phosphoric acid alkyl ester, 38 g of a copolymer of 95% by weight vinyl chloride and 5% by weight vinyl triethoxysilane, and 11.0 g of a lubricant

What is claimed is:

1. A process for the preparation of a magnetic recording and storage material having a flexible layer support carrying and having adhered thereto a layer comprised of a film-forming polymer composition acting as a binder for ferromagnetic particles dispersed in the layer, comprising the steps of dispersing ferromagnetic particles selected from the group consisting of $\text{CrO}_2$ and $Fe_2O_3$ particles in a film-forming composition which contains at least 50 percent by weight of a copolymer wherein the copolymer used contains a polymerizable alkoxysilane compound which is based on the formula $(R_1O)_3Si—R_2$ in which $R_1$ represents an alkyl group containing 1 to 9 carbon atoms, and $R_2$ represents a group which contains a copolymerizable double bond, having a backbone chain and having attached to the backbone chain recurring side chain trialkoxysilane groups with one or more comonomers free of alkoxysilane groups selected from the group consisting of vinyl chloride, vinylidene chloride, vinyl acetate, vinyl ethers, acrylic acid esters, methacrylic acid esters, acrylonitrile and styrene;

wherein the said copolymer based on the weight of the copolymer contains 3 to 10% by weight of trialkoxysilane units, said trialkoxysilane units being derived from trialkoxysilane compounds which contain copolymerizable carbon-carbon double bonds selected from the group consisting of vinyl trimethyloxysilane, vinyl triethoxysilane, vinyl tri-tert. butoxysilanemethacryloxy-propyl trimethoxysilane, and said film-forming composition contains from 0–50 percent by weight of a polymeric binder composition free from said alkoxysilane compounds, coating the dispersion of magnetizable material in the composition on a flexible support, and hardening the composition by cross-linking the side chains by a catalyzed reaction with a catalyst selected from the group of acid catalyzed-cross-linking catalysts and alkaline catalyzed-cross-linking catalysts.

* * * * *